(12) United States Patent
Asoma

(10) Patent No.: US 6,404,721 B1
(45) Date of Patent: Jun. 11, 2002

(54) OPTICAL HEAD AND OPTICAL DISC DEVICE

(75) Inventor: Yoshito Asoma, Saitama (JP)

(73) Assignee: Sony Corporation (JP)

( * ) Notice: Subject to any disclaimer, the term of this patent is extended or adjusted under 35 U.S.C. 154(b) by 64 days.

(21) Appl. No.: 09/669,656

(22) Filed: Sep. 26, 2000

(30) Foreign Application Priority Data

Sep. 28, 1999 (JP) ........................................... 11-274744

(51) Int. Cl.$^7$ ................................................. G11B 7/00
(52) U.S. Cl. ................... 369/112.01; 369/120; 369/121
(58) Field of Search ........................... 369/44.37, 44.41, 369/112.01, 112.05, 120, 121, 124.03, 112.28

(56) References Cited

U.S. PATENT DOCUMENTS 6,272,098 B1 * 8/2001 Takahashi et al. ..... 369/112.17
6,285,646 B1 * 9/2001 Yoo et al. .............. 369/112.26
6,304,542 B1 * 10/2001 Dang et al. ............ 369/112.23

* cited by examiner

*Primary Examiner*—Paul W. Huber
(74) *Attorney, Agent, or Firm*—Ronald P. Kananen; Rader, Fishman & Grauer PLLC (57) ABSTRACT

An optical head includes a light radiating unit in which the relative positions of first and second light sources is set so that a straight line interconnecting a spot position of the laser light illuminated on an optical disc and a spot position of the second laser light similarly illuminated on the optical disc will be substantially perpendicular to a recording track on the optical disc, and a light receiving element having plural light receiving portions which are obtained on splitting by a splitting line substantially parallel to the straight line interconnecting the spot position of the laser light illuminated on an optical disc and the spot position of the second laser light similarly illuminated on the optical disc and which is projected on the optical disc. With this configuration, return light beams of respective laser light beams radiated from respective light sources of the light radiating unit, housing these light sources in the same package, can be properly received by the plural light receiving sections of the light receiving unit. The respective laser light sources radiate laser light beams associated with plural optical disc of different kinds.

25 Claims, 5 Drawing Sheets

OPTICAL HEAD AND OPTICAL DISC DEVICE

BACKGROUND OF THE INVENTION

1. Field of the Invention

This invention relates to an optical head associated with plural optical recording mediums of different types and to an optical disc device for recording and/or reproducing signals for plural optical discs of different types using such optical head.

2. Description of Related Art

As an optical recording medium, a replay-only optical disc, called a CD (Compact Disc), or a write-once optical disc, called CD-R (Compact Disc-Recordable), is being put to practical use. These optical discs are in widespread use because the discs are superior in mass-productivity and can be manufactured at low cost, while being usable for recording or reproducing the information in high stability.

Meanwhile, in these optical discs, the recent tendency is towards higher recording capacity. Amidst this tendency, the DVD (Digital Versatile Disc/Digital Video Disc) which, despite the fact that its outer diameter is equal to that of the CD, has a drastically improved recording capacity, such that data corresponding to a motion picture can be stored therein with the picture quality comparable to that of the current television broadcast, has been developed and put to practical use. In this DVD, the laser light shorter in wavelength than the laser used for a CD is used for recording and/or reproducing the information in order to elevate the recording density to increase the recording capacity.

As to an optical disc device, employing a so-called compatible optical disc as a recording medium such an optical disc device has been developed in which there is provided an optical head capable of recording and/or reproducing not only the information for the DVD but also that for the CD or CD-R.

Meanwhile, in the optical head capable of accommodating both the CD or the CD-R and the DVD, the optical system for the CD or the CD-R desirably has as many portions in common with the optical system for the DVD as possible, in order to reduce the overall size of the head or to lower the manufacturing cost.

In order to meet this demand, development of an optical head having a so-called double-wavelength semiconductor laser for selectively radiating the laser light for coping with the CD or the CD-R and the laser light for coping with the DVD, is underway.

In the double-wavelength semiconductor laser, a light source for radiating the laser light adapted for coping with the CD or the CD-R and a light source for radiating the laser light adapted for coping with the DVD are arranged in proximity to each other and are housed in the same package. This optical head also is provided with a light receiving element for receiving the return beams of the laser light beams reflected back form the optical disc in order to enable detection of tracking error signals or focussing error signals adapted for coping with the CD or the CD-R and with the DVD. This light receiving element has plural light receiving sections which are obtained on splitting the element to permit the return light beams of the laser light beams reflected back from the optical disc to be illuminated on pre-set portions of the optical disc.

However, in this optical head provided with the double-wavelength semiconductor laser, there are occasions wherein, if the distance between the light sources is deviated from a pre-set design value, the return beams of the laser light beams radiated from these light sources cannot be properly received by the plural light receiving sections of the light receiving element.

Thus, this optical head cannot detect the focussing error signals or the tracking error signals adapted for coping with both the CD or the CD-R and the DVD, such that, when the optical head is loaded on an optical disc device, the focussing control for focussing the objective lens on the signal recording surface of the objective lens or the tracking control for permitting the laser light spot to follow the recording track on the signal recording surface of the optical disc cannot be performed properly.

SUMMARY OF THE INVENTION

It is therefore an object of the present invention to provide an optical head in which return light beams of respective laser light beams radiated from the light sources of light radiating means, which are housed in the same package and which radiate laser light beams adapted to cope with plural optical recording mediums of different kinds, can be properly received by plural light receiving sections of the light receiving means. It is another object of the present invention to provide an optical disc device which enables signals to be recorded and/or reproduced to or from plural optical recording mediums of different kinds.

In one aspect, the present invention provides an optical head adapted for coping with a plurality of optical recording mediums of different types, in which the optical head includes light radiating means having a first light source for radiating the first laser light and a second light source for radiating the second laser light with a wavelength different from that of the first laser light, light converging means for converging the laser light from the light radiating means towards the optical recording medium, a beam splitter for separating the optical path of the laser light proceeding towards the optical recording medium and that of the laser light reflected from the optical recording medium and light receiving means for receiving the return laser light reflected back from the optical recording medium. The first and second light sources are housed in the same package. The relative positions of the first and second light sources of the light radiating means are so set that a straight line interconnecting a spot position of the first laser light illuminated on the optical recording medium and a spot position of the second laser light illuminated on the optical recording medium will be substantially perpendicular to a recording track of the optical recording medium. The light receiving means includes a plurality of light receiving sections obtained on splitting by a splitting line substantially parallel to a straight line projected on the light receiving means, the straight line being such a line interconnecting a spot position of the first laser light illuminated on the optical recording medium and a spot position of the second laser light illuminated on the optical recording medium.

In another aspect, the present invention provides an optical head adapted for coping with a plurality of optical discs of different types, in which the optical head included a semiconductor laser having a first light source for radiating the first laser light and a second light source for radiating the second laser light with a wavelength different from that of the first laser light, an objective lens for converging the laser light from the semiconductor laser on the optical disc, a beam splitter for separating the optical path of the laser light proceeding towards the optical disc and that of the laser light reflected from the optical disc from each other and a light receiving element for receiving the return laser light reflected back from the optical disc. The first and second light sources are housed in the same package in proximity to each other, with the semiconductor laser selectively emitting the first laser light or the second laser light depending on the disc type. The relative positions of the first and second light sources of the semiconductor laser are so set that a straight line interconnecting a spot position of the first laser light illuminated on the optical disc and a spot position of the second laser light illuminated on the optical disc will be substantially perpendicular to a recording track of the optical disc. The light receiving element includes a plurality of light receiving sections obtained on splitting by a splitting line substantially parallel to a straight line projected on the light receiving unit, the straight line being such a line interconnecting a spot position of the first laser light illuminated on the optical disc and a spot position of the second laser light similarly illuminated on the optical disc.

In yet another aspect, the present invention provides an optical disc device for recording and/or reproducing signals in association with a plurality of optical discs of different types, in which the apparatus includes a spindle motor for rotationally driving the optical disc, an optical head adapted for coping with the plural optical discs of different types and a signal processing circuit for generating playback signals and control signals based on signals detected by the optical head. The optical head includes light radiating means having a first light source for radiating the first laser light and a second light source for radiating the second laser light with a wavelength different from that of the first laser light, an objective lens for converging the laser light from the light radiating means towards an optical disc, a beam splitter for separating the optical path of the laser light radiated from the light radiating means into an optical path of the laser light proceeding towards the optical disc and that of the laser light reflected from the optical disc and a light receiving element for receiving the return laser light reflected back from the optical disc. The first and second light sources are housed in the same package. The relative positions of the first and second light sources of the light radiating means are so set that a straight line interconnecting a spot position of the first laser light illuminated on the optical disc and a spot position of the second laser light illuminated on the optical disc will be substantially perpendicular to a recording track of the optical disc. The light receiving element includes a plurality of light receiving sections obtained on splitting by a splitting line substantially parallel to a straight line projected on the light receiving means, the straight line being such a line interconnecting a spot position of the first laser light illuminated on the optical disc and a spot position of the second laser light similarly illuminated on the optical disc.

According to the present invention, as described above, the return light from an optical recording medium illuminated by the first light source and the return light from the optical recording medium illuminated by the second light source can be properly illuminated on split portions of plural light receiving sections obtained on splitting along a splitting line subsequently, which is parallel to a straight line interconnecting the spot position of the first laser light illuminated on the optical recording medium and the spot position of the second laser light, and which is projected on the light receiving sections, even if an error is produced between the first and second light source of the light radiating means.

Therefore, with the optical head embodying the present invention, the light reception signals for generating the focussing error signals or the tracking error signals, adapted for coping with plural optical recording medium of different types, such as CD-R or DVD., can be detected appropriately.

Moreover, with the optical disc device embodying the present invention, provided with the above-described optical disc device, it is possible to record and/or reproduce signals for plural optical discs of different types.

DESCRIPTION OF THE PREFERRED EMBODIMENTS

Referring to the drawings, preferred embodiments of the present invention will be explained in detail.

Figure 1:
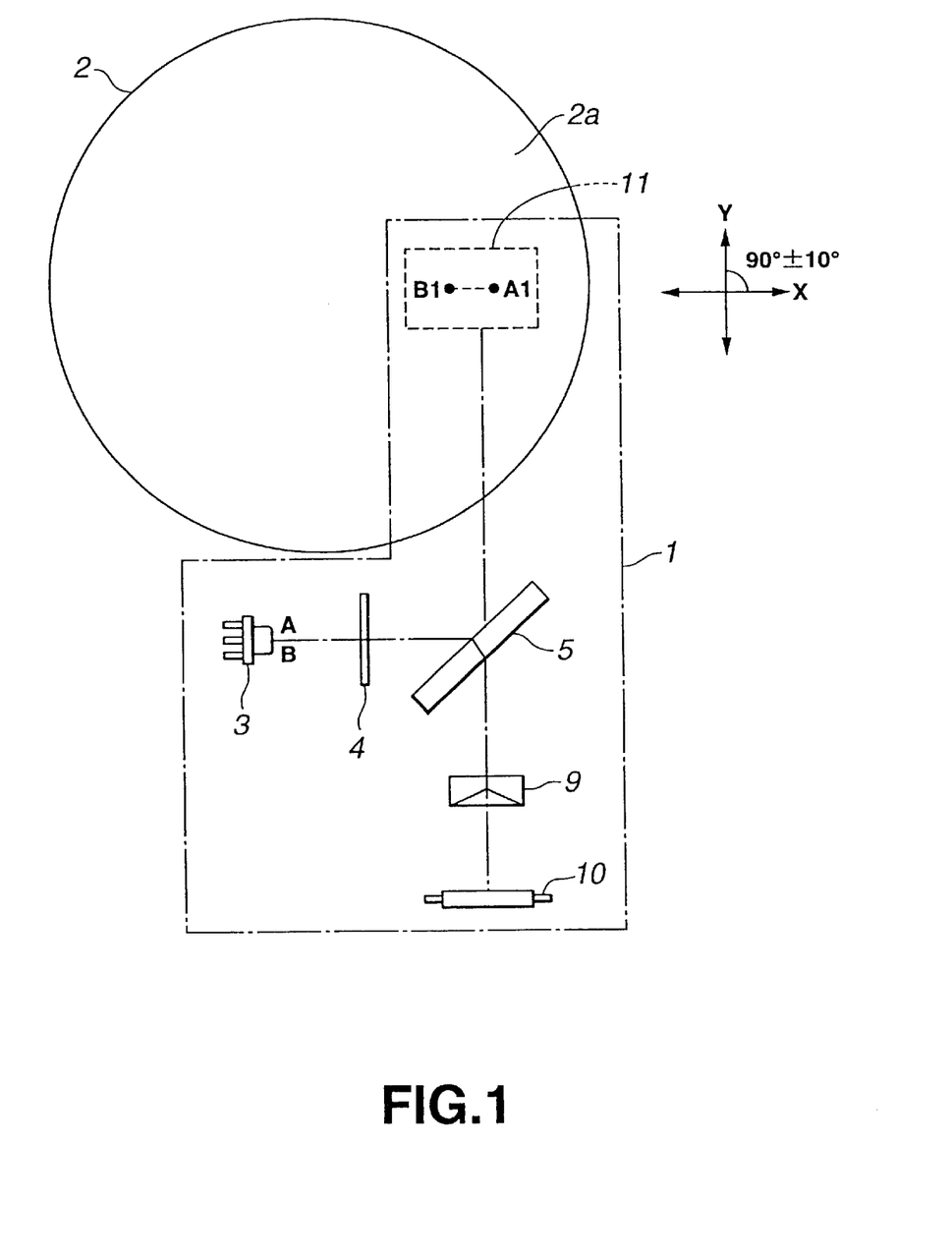
FIG. 1 is a schematic plan view showing an illustrative structure of an optical head embodying the present invention.
Figure 2:
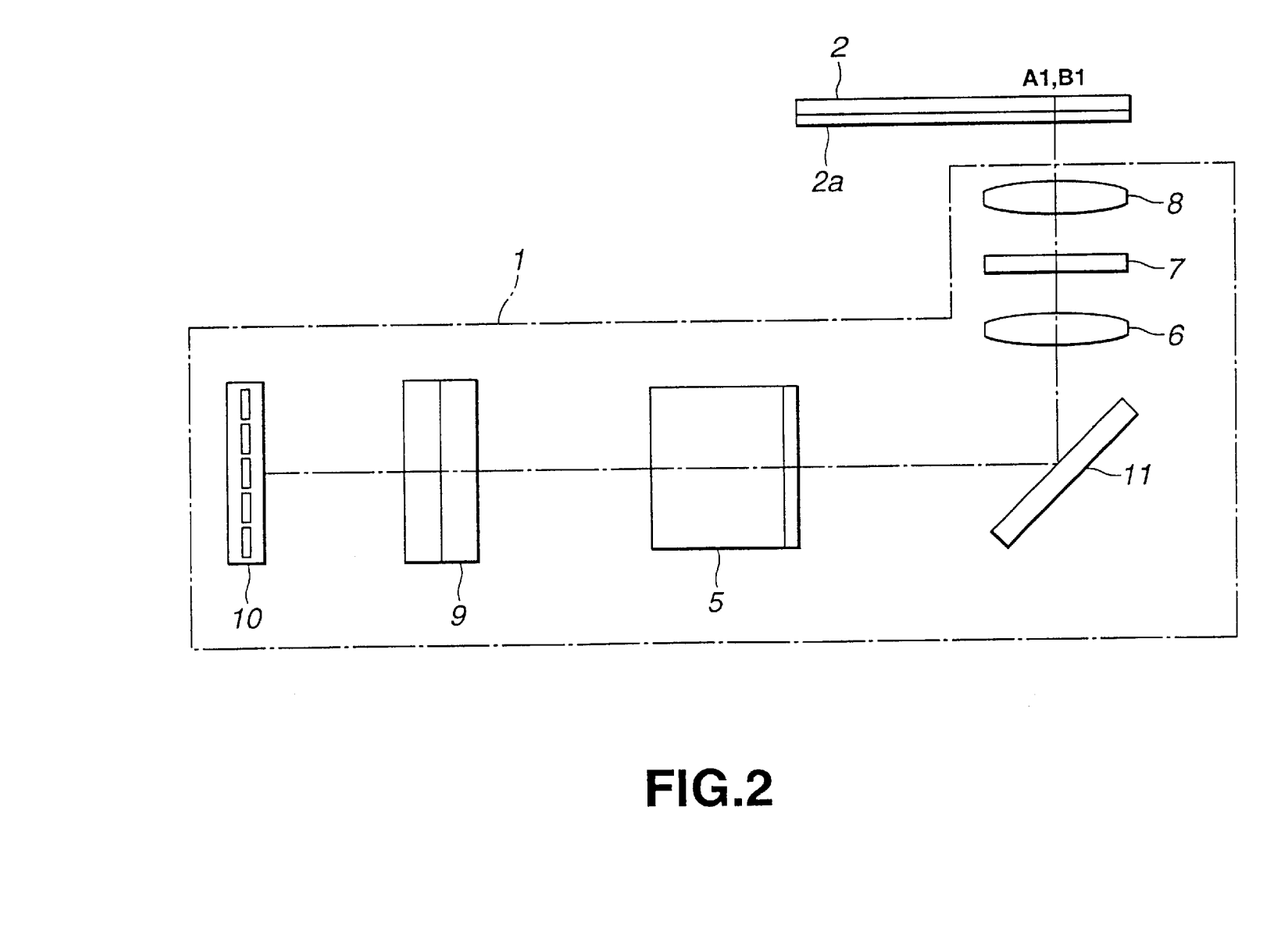
FIG. 2 is a schematic side view showing the structure of the optical head.

FIGS. 1 and 2 show an illustrative structure of an optical head 1 embodying the present invention.

This optical head 1 is adapted for coping with two sorts of optical discs 2 for recording and/or reproducing the information, using laser light beams of different wavelengths, such as a CD-R (compact disc—recordable) made up of a sole disc substrate with a thickness of 1.2 mm, and a DVD (Digital Versatile Disc/Digital Video Disc) made up of two disc substrates, each 0.6 mm in thickness, stuck together. FIG. 1 is a schematic plan view of the optical head 1 looking from a direction substantially perpendicular to a signal recording surface 2a of the optical disc 2, whilst FIG. 2 is a schematic side view of the optical head 1 looking from the direction substantially parallel to the signal recording surface 2a of the optical head 2.

This optical disc 1 includes a double-wavelength semiconductor laser 3, radiating laser light beams of two different laser light beams, a grating 4 for splitting the laser light beams radiated from the double-wavelength semiconductor laser 3 into plural portions, and a beam splitter 5 arranged in an optical path of the laser light passed through this grating 4. The optical disc 1 also includes a collimator lens 6 for transforming the laser light passed through the beam splitter 5 into parallel light, and a quarter wave plate 7 arranged in the optical path of the laser light transformed into the parallel light by the collimator lens 6. The optical head 1 also includes an objective lens 8 for converging the laser light passed through the quarter wave plate 7 onto the signal recording surface 2a of the optical disc 2, a Foucault prism 9 passed through by the return light reflected back from the signal recording surface 2a of the optical disc 2, and a light receiving element 10 for receiving the laser light passed through the Foucault prism 9.

On the optical path between the beam splitter 5 and the collimator lens 6 of the optical head 1 is arranged a mirror 11, so that the laser light transmitted through the beam splitter 5 is reflected and warped by the mirror 11 so as to be illuminated substantially at right angles to the signal recording surface 2a of the optical disc 2 arranged above the optical head 1.

Figure 3:
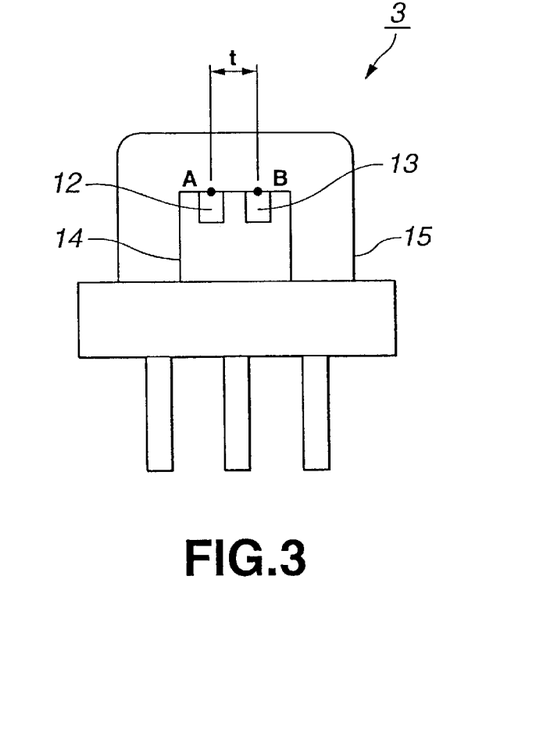
FIG. 3 is a see-through plan view showing an illustrative structure of a double-wavelength semiconductor laser of the optical head.

The double-wavelength semiconductor laser 3 is a light emitting element exploiting recombination radiation of a semiconductor, and is configured for selectively radiating the laser light with the wavelength of approximately 780 nm, which is an optimum wavelength for a CD-R made up of a sole disc substrate with a thickness of 1.2 mm, or the laser light with the wavelength of approximately 650 nm, which is an optimum wavelength for a DVD, made up of two disc substrates, each with a thickness of 0.6 mm, bonded together. The laser light with the wavelength of approximately 780 nm and the laser light with the wavelength of approximately 650 nm are referred to below as the first laser light and the second laser light, respectively. Specifically, this double-wavelength semiconductor laser 3 includes a first laser chip 12 having a first light emitting point A for radiating the laser light coping with the optical disc 2 which is a CD-R, and a second laser chip 13 having a second light emitting point B for radiating the laser light coping with the optical disc 2 which is a DVD, as shown in FIG. 3. The double-wavelength semiconductor laser 3 is of a structure such that the first laser chip 12 and the second laser chip 13 are arranged on a base block 14 which base block 14 is housed within a package member 15. Meanwhile, in the double-wavelength semiconductor laser 3, the first laser chip 12 and the second laser chip 13 may be integrally molded to a sole laser chip.

In this double-wavelength semiconductor laser 3, the first laser chip 12 and the second laser chip 13 are arranged in proximity to each other on the base block 14, with the distance t between the first light emitting point A and the second light emitting point B being of the order of 80 to 200 $\mu$m. Thus, the first laser light and the second laser light, radiated from the double-wavelength semiconductor laser 3, are illuminated on the optical disc 2 on substantially the same optical route.

The first laser chip 12 and the second laser chip 13 are arranged in a plane on the base block 14 substantially parallel to the signal recording surface 2a of the optical disc 2. So, from the double-wavelength semiconductor laser 3, the first laser light and the second laser light are radiated in a direction substantially parallel to the signal recording surface 2a of the optical disc 2.

The grating 4 is a diffracting grating, as shown in FIG. 1, and is configured for diffracting the laser light radiated from the double-wavelength semiconductor laser 3 to split the laser light into plural light beams inclusive of three light beams of the 0-order light beam and ±1 order light beams. The laser light split by this grating 4 falls on the beam splitter 5. Meanwhile, the light beams of the laser light, split by the grating 4, other than the 0 order light beam and the ±1 order light beams, are omitted in the following explanation.

The beam splitter 5 reflects the laser light radiated from the double-wavelength semiconductor laser 3 to route the reflected light to the optical disc 2, while transmitting the return light reflected back from the optical disc 2 therethrough to route the return light beam to the light receiving element 10. The laser light, as the divergent light reflected by the beam splitter 5, is transformed into a parallel light beam by the collimator lens 6 and transmitted through the quarter wave plate 7.

Meanwhile, if the laser light radiated from the double-wavelength semiconductor laser 3 is the polarized light, the beam splitter 5 may be designed as a polarizing beam splitter to prevent the return light reflected back from the optical disc 2 from being returned to the double-wavelength semiconductor laser 3.

The quarter wave plate 7 affords the phase difference of $\pi/2$ to the laser light transmitted therethrough. The laser light transmitted through the quarter wave plate 7 is the circularly polarized light or the linearly polarized light when the laser light is illuminated on the optical disc or reflected back from the optical disc, respectively. The laser light transmitted through the quarter wave plate is converged by the objective lens 8 on the signal recording surface 2a of the optical disc 2.

The objective lens 8 is supported for movement freely by a biaxial actuator, not shown. The objective lens 8 is moved by this biaxial actuator, based on tracking error signals and focussing error signals generated by the return light from the optical disc 2 received by the light receiving element 10, as later explained, in two directions, that is in a direction towards and away from the optical disc 2 and in a direction radially of t the optical disc 2. The objective lens 8 converges the laser light, radiated from the double-wavelength semiconductor laser 3, so that the laser light will be focussed on the signal recording surface 2a of the optical disc 2. The objective lens 8 also causes the converged laser light to follow the recording track formed on the signal recording surface 2a of the optical disc 2.

The laser light converged on the signal recording surface 2a of the optical disc 2 is illuminated so that a straight line interconnecting a spot position A1 of the first laser light radiated from the first laser chip 12 and a spot position B1 of the second laser light radiated from the second laser chip 13, that is a straight line shown by a dotted line in FIG. 1, will be substantially perpendicular, specifically, at an angle of 90°±10°, to the recording track on the signal recording surface 2a of the optical disc 2. That is, in the double-wavelength semiconductor laser 3, the first laser chip 12 and the second laser chip 13 are arranged on the base block 14 so that a straight line interconnecting a spot position A1 of the first laser light and a spot position B1 of the second laser light, converged on the signal recording surface 2a of the optical disc 2, will be at an angle between 90°±10° with respect to the recording track on the signal recording surface 2a of the optical disc 2.

Also, in the double-wavelength semiconductor laser 3, the direction in which the light emitting point A of the first laser chip 12 and the light emitting point B of the second laser chip 13 are arrayed is substantially perpendicular to a straight line interconnecting the spot position A1 of the first laser light and the spot position B1 of the second laser light.

In the following explanation, the direction of the straight line interconnecting the spot position A1 of the first laser light and the spot position B1 of the second laser light, converged on the signal recording surface 2a of the optical disc 2 is indicated by an arrow X, whilst the direction of the recording track on the signal recording surface 2a of the optical disc 2 is indicated by arrow Y.

The laser light converged on the signal recording surface 2a of the optical disc 2 is collimated by being reflected by the signal recording surface 2a and by being passed through the objective lens 8. The return light, reflected back from the optical disc 2, is converged by being passed through the collimator lens 6 through the quarter wave plate 7 and is subsequently passed through the beam splitter 5. The return light, transmitted through the beam splitter 5, falls on the Foucault prism 9.

In order to detect the focussing error signals by the Foucault method, the Foucault prism 9 further splits the return light, reflected back from the optical disc 2, into four portions, in a direction perpendicular to the light splitting direction by the grating 4, into the 0 order light and ±1 order light, as shown in FIG. 1. Stated differently, the return light reflected back from the optical disc 2 is split into four portions, by being passed through the Foucault prism 9, substantially at right angles to the direction X of the straight line interconnecting the spot position A1 of the first laser light and the spot position B1 of the second laser light, converged on the signal recording surface 2a of the optical disc 2. The return light, split by the Foucault prism 9, falls on the light receiving element 10.

Figure 4:
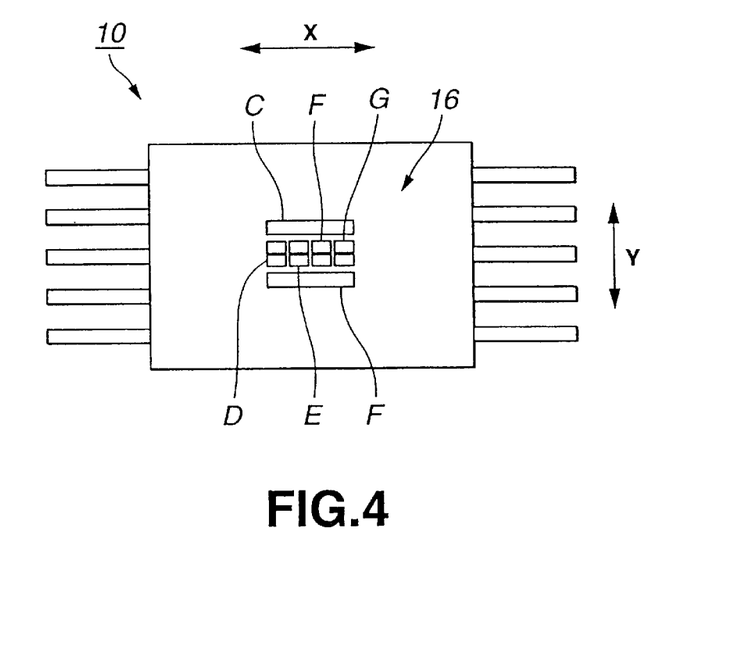
FIG. 4 is a schematic plan view showing an illustrative structure of a light receiving element of the optical head.
Figure 5:
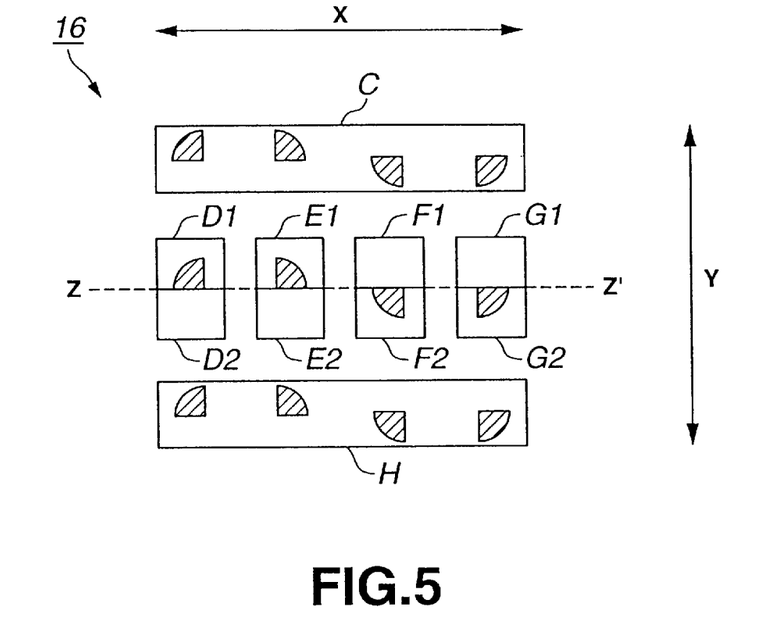
FIG. 5 is a schematic plan view showing light receiving sections of the light receiving element to an enlarged scale.

Referring to FIGS. 4 and 5, the light receiving element 10 includes a light receiving unit 16 and a voltage transforming circuit for transforming the current from the light receiving unit 16 into the voltage. The light receiving unit 16 is adapted for receiving the return beam of the first laser light reflected back from the signal recording surface 2a of the optical disc 2 (CD-R) and the return beam of the second laser light reflected back form the signal recording surface 2a of the optical disc 2 (DVD), and is integrated with the voltage transforming circuit into one unit. Meanwhile, FIG. 5 is a schematic plan view showing the light receiving unit 16 of the light receiving element 10 of FIG. 4 to an enlarged scale.

In the light receiving element 10, the light receiving unit 16 includes a light receiving portion C, four light receiving sections D, E, F and G and a light receiving portion H. Of the 0 order light and ±1 order light, obtained on splitting by the grating 4, the ±1 order light, as a sub-beam, the 0 order light, as the main beam, and the −1 order light, as the sub-beam, are received by the light receiving portion C, by the four light receiving sections D, E, F and G and by the light receiving portion H, respectively. These six light receiving sections C, D, E, F, G and H are arrayed along a direction corresponding to the direction X of the straight line interconnecting the spot position A1 of the first laser light and the spot position B1 of the second laser light, converged on the signal recording surface 2a of the optical disc 2. Of the light receiving sections C, D, E, F, G and H, the light receiving sections C and H are arranged on both sides of the light receiving sections D, E, F and G.

The four light receiving sections D, E, F and G, adapted for receiving the 0 order light, as the main beam, are provided with light receiving portions D1, D2, E1, E2, F1, F2, G1 and G2, obtained on spitting along a splitting line Z–Z' substantially parallel to a straight line obtained in turn on projecting a straight line interconnecting the spot position A1 of the first laser light and the spot position B1 of the second laser light, converged on the signal recording surface 2a of the optical disc 2, on the light receiving portion 16. Stated differently, the four light receiving sections D, E, F and G are split in two portions along a direction corresponding to the direction X of the straight line interconnecting the spot position A1 of the first laser light and the spot position B1 of the second laser light radiated by the second laser chip 13.

The light receiving element 10 receives the return beam of the first laser light, reflected by the signal recording surface 2a of the optical disc 2 (CD-R), by the light receiving sections C, H, to detect light reception signals for generating the tracking error signals TR1 by the three-beam method.

The light receiving element 10 also receives the return beam of the first laser light, reflected by the signal recording surface 2a of the optical disc 2 (CD-R), by the light receiving sections D to G, to detect light reception signals used for generating the playback signals RF 1 and the focussing error signals FE1 by the Foucault method.

Specifically, if the light reception signals, derived from the first laser light received by the light receiving portions C, D1, D2, E1, E2, F1, F2, G1, G2 and H of the light receiving element 10 are denoted SC1, SD1, SD2, SE1, SE2, SF1, SF2, SG1, SG2 and SH1, respectively, the playback signal RF1, focussing error signals FE1 and the tracking error signals TR1 may be found by the following equations:

$$RF1=SD1+SD2+SE1+SE2+SF1+SF2+SG1+SG2$$

$$FE1=(SD1+SE1+SF1+SG1)-(SD2+SE2+SF1+SG1)$$

$$TR1=SC1-SH1.$$

On the other hand, the light receiving element 10 receives the return light of the second laser light, reflected back from the signal recording surface 2a of the optical disc 2 (DVD) by the light receiving sections D to G, to detect light reception signals for generating the tracking error signals by the DPD (differential phase detection) method and light detection signals for generating the focussing error signals by the Foucault method.

Specifically, if the light reception signals, derived from the second laser light and which have been received by the light receiving portions C, D1, D2, E1, E2, F1, F2, G1, G2 and H of the light receiving element 10, are denoted SC1', SD1', SD2', SE1', SE2', SF1', SF2', SG1', SG2'and SH1', respectively, the playback signal RF2, focussing error signals FE2 and the tracking error signals TR2 may be found by the following equations:

$$RF2=SD1'+SD2'+SE1'+SE2'+SF1'+SF2'+SG1'+SG2'$$

$$FE2=(SD1'+SE1'+SF2'+SG2')-(SD2'+SE2'+SF1'+SG1')$$

$$TR2=(SD1+SE1+SF1+SG1)-(SD2+SE2+SF1+SG1).$$

In the optical head 1, adjustment is so made that, in the four light receiving sections D, E, F and G, receiving the 0 order light, as the main beam, if the straight line interconnecting the spot position A1 of the first laser light converged on the signal recording surface 2a of the optical disc 2 and the spot position B1 of the second laser light converged on this signal recording surface 2a is projected on the light receiving unit 16, the return light of the first laser light reflected back on the signal recording surface 2a of the optical disc 2 (CD-R) and the return light of the second laser light reflected by the signal recording surface 2a of the optical disc 2 (DVD) will be illuminated on the portions of the light receiving portions D1, D2, F1, F2, G1 and G2 divided by the splitting line Z–Z' substantially parallel to the projected straight line.

Figure 6:
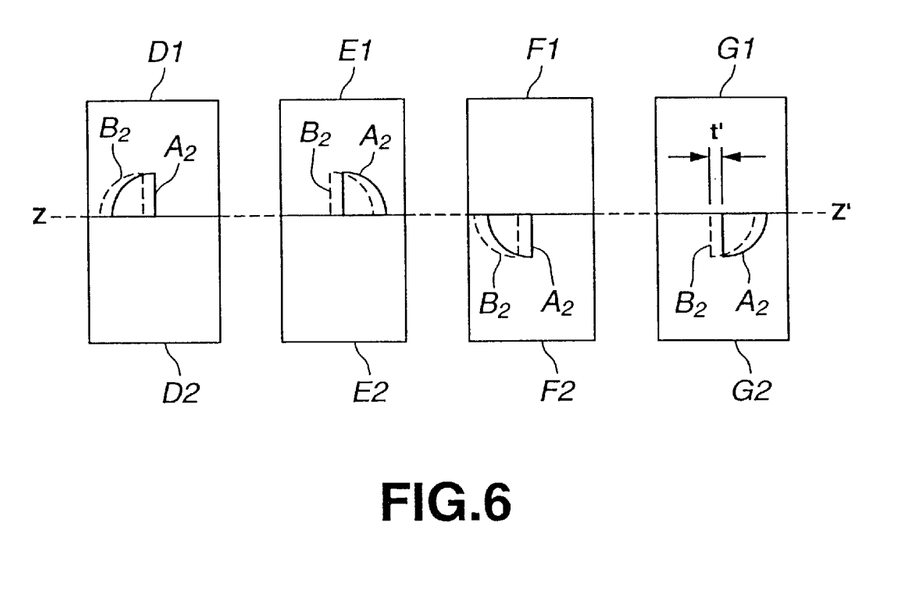
FIG. 6 is a schematic plan view showing four light-receiving sections D, E, F and G to an enlarged scale.

In such case, if, when an error be produced in a separation t between the first light emitting point A of the first laser chip 12 radiating the first laser light shown in FIG. 3 and the light emitting point B of the second laser chip 13 radiating the second laser light, such that the separation t' between the spot position of the first laser light illuminated on the four light receiving sections D, E, F and G and the spot position B2 of the second laser light shown in FIG. 6 is deviated from a pre-set design value, the straight line interconnecting the spot position A1 of the first laser light converged on the signal recording surface 2a of the optical disc 2 and the spot position B1 of the second laser light converged on this signal recording surface 2a is projected on the light receiving unit 16, the portions of the light receiving portions D1, D2, light receiving portions E1, E2, light receiving portions F1, F2 and the light receiving portions G1, G2 obtained on splitting along the splitting line Z–Z', substantially parallel to the projected line, may be illuminated properly.

That is, in this optical head 1, the four light receiving sections D, E, F and G are divided each in two portions along the direction X interconnecting the spot position A1 of the first laser light converged on the signal recording surface 2a of the optical disc 2 and the spot position B1 of the second laser light.

Thus, in this optical head 1, if the separation t' between a first spot position of the first laser light illuminated on the four light receiving sections D, E, F and G and a second spot position B2 of the second laser light is deviated from a pre-set design value, the first spot position A2 and the second spot position B2 are deviated along the direction of the straight line interconnecting the spot position A1 of the first laser light converged on the signal recording surface 2a of the optical disc 2 and the spot position B1 of the second laser light.

In this manner, with the present optical head 1, the return beam from the optical disc 2, illuminated by the first laser light radiated from the first laser chip 12 of the double-wavelength semiconductor laser 3, and the return beam from the optical disc 2, illuminated by the second laser light radiated from the second laser chip, may be properly illuminated on the splitting portions of the light receiving portions D1, D2, light receiving portions E1, E2, light receiving portions F1, F2 and the light receiving portions G1, G2 of the light receiving element 10.

Thus, with the present optical head 1, light reception signals for generating focussing error signals or the tracking error signals, adapted for coping with both optical discs 2, that is the CD-R and the DVD, can be detected properly, such that, when the optical head 1 is loaded on an optical disc device, which will be explained later, focussing control and tracking control can be performed appropriately.

Meanwhile, in the present optical head 1, the relative position between the first laser chip 12 and the second laser chip 13 is set so that a straight line interconnecting the spot position A1 of the first laser light radiated from the first laser chip 12 and the spot position B1 of the second laser light radiated from the second laser chip 13, that is a straight line shown by a dotted line in FIG. 1, will be at an angle of 90±10° with respect to the recording track on the signal recording surface 2a of the optical disc 2.

If, in this case, the tolerance is on the order of ±10° with respect to the direction perpendicular to the track direction, there is no adverse effect on detection of the light reception signals used for generating the playback signals, focussing error signals or tracking error signals in the light receiving element 10.

The embodiment in which the return beam of the first laser light and the return beam of the second laser light are received to generate the focussing error signals FE1 and FE2 by the Foucault method, the optical head embodying the present invention is not limited to the above-described embodiment. For example, it is also possible to detect light reception signals used for generating the focussing error signals FE1 and FE2 by e.g., a knife edge method or a differential concentric circle method.

In this case, the four light receiving sections C, D, F and G of the light receiving element 10 may be constituted by the light receiving portions D1, D2, light receiving portions E1, E2, light receiving portions F1, F2 and the light receiving portions G1, G2, split only by a splitting line Z–Z', which is substantially parallel to a straight line interconnecting the spot position A1 of the first laser light radiated from the first laser chip 12 and the spot position B1 of the second laser light radiated from the second laser chip 13, and which is then projected on the light receiving unit 16.

Meanwhile, the four light receiving sections C, D, F and G, split only by the splitting line Z–Z', may be further split into eight portions by splitting the four light receiving sections C, D, F and G along a division line perpendicular to the splitting line Z–Z', for positioning the spot position of the first laser light illuminated on the four light receiving sections C, D, F and G and the spot position B2 of the second laser light.

Figure 7:
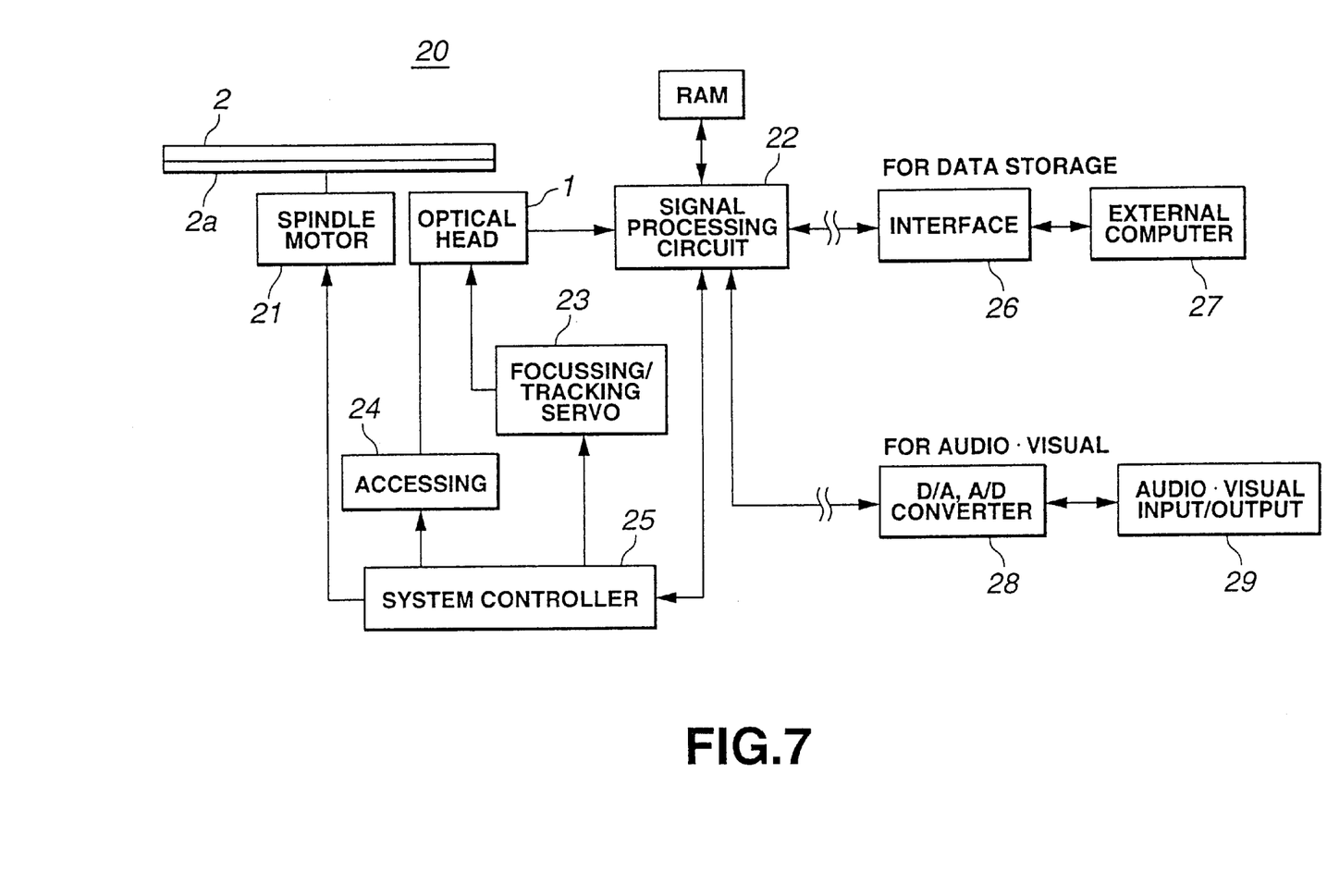
FIG. 7 is a block diagram showing the structure of an optical disc device carrying the optical head.

The above-described optical head 1 is loaded on an optical disc device 20, adapted for coping with two types of the optical disc 2, such as a CD-R (Compact Disc Recordable), made up only of a sole disc substrate with a thickness of 1.2 mm, and a DVD (Digital Versatile Disc/Digital Video Disc) made up of two optical discs, each with a thickness of 0.6 mm, bonded together, to record and/or reproduce the information using the first laser light and the second laser light differing from each other.

The optical disc device 20 includes a spindle motor 21 for rotationally driving the optical disc 2, the above-mentioned optical head 1 for illuminating the laser light on the signal recording surface 2a of the optical disc 2 loaded on the spindle motor 21 and for detecting the return beam from the optical disc 2, and a signal processing circuit 22 for generating the playback signals and control signals based on light reception signals detected by the optical head 1. The optical disc device 20 also includes a focussing/tracking servo unit 23 for performing focussing control and tracking control based on the control signals from the signal processing circuit 22. The optical disc device 20 also includes an accessing unit 24 for causing the optical head 1 to be moved along the disc radius towards a pre-set recording track of the optical disc 2. Moreover, the optical disc device 20 includes a system controller 25 for controlling the spindle motor 21, focussing/tracking servo unit 23 and the accessing unit 24 based on the signal generated by the signal processing circuit 22.

The spindle motor 21 is driven under control by the system controller 25 to cause the optical disc 2 to be rotated at a pre-set speed.

The optical head 1 illuminates the laser light on the signal recording surface 2a of the optical disc 2, rotationally driven by the spindle motor 21, to detect the return beam reflected back from the signal recording surface 2a of the optical disc 2 to output the detected return beam to the signal processing circuit 22. At this time, the optical head 1 selectively outputs the above-mentioned first or second laser light, depending on the type of the rotating optical disc 2.

The signal processing circuit 22 demodulates the playback signals and the control signals, obtained based on the light detection signals detected by the optical head 1, by a signal demodulating unit, while correcting errors in an error correction unit.

The playback signals, demodulated and corrected for errors by the signal processing circuit 22, are transmitted through an interface 26 to e.g., an external computer 27. The playback signals, if used for audio-visual, are digital/analog converted by a D/A converting unit of the D/A and A/D converter 28, and thence supplied to an audio equipment 29.

The various control signals, demodulated by the signal processing circuit, are output to the system controller 25, which then drives the focussing/tracking servo unit 23 based on the focussing error signals and the tracking error signals among the control signals. The focussing/tracking servo unit 23 causes the biaxial actuator of the optical head 1 to be moved in two axial directions, that is in a direction towards and away from the optical disc 2 and in a direction along the disc radius, under control by the system controller 25, by way of performing the focussing control and the tracking control.

On the other hand, the accessing unit 24 feeds the optical head 1 along the disc radius, based on signals supplied from the system controller 25, to put the optical head 1 on a pre-set recording track of the optical disc 2.

In the above-described optical disc device 20, the focussing control and the tracking control can be performed properly by loading the inventive optical disc 1 thereon to enable the signal to be recorded and/or reproduced on or from the optical disc 2.

What is claimed is:

1. An optical head adapted for coping with a plurality of optical recording mediums of different types, comprising:
    light radiating means including a first light source for radiating a first laser light and a second light source for radiating a second laser light having a wavelength different from that of said first laser light, said first and second light sources being housed in the same package;
    light converging means for converging the laser light from said light radiating means towards said optical recording medium;
    a beam splitter for separating the optical path of the laser light proceeding towards said optical recording medium and that of the laser light reflected from said optical recording medium; and
    light receiving means for receiving the return laser light reflected back from said optical recording medium; wherein
    the relative positions of said first and second light sources of said light radiating means are so set that a straight line interconnecting a spot position of said first laser light illuminated on said optical recording medium and a spot position of said second laser light illuminated on said optical recording medium will be substantially perpendicular to a recording track of said optical recording medium; and wherein
    said light receiving means includes a plurality of light receiving sections arranged substantially parallel to a straight line projected on said light receiving means, said straight line being such a line interconnecting a spot position of said first laser light illuminated on said optical recording medium and a spot position of said second laser light illuminated on said optical recording medium.

2. The optical head according to claim 1 wherein the separation between said first light source and the second light source is 80 to 200 μm.

3. The optical head according to claim 1 wherein a quarter wave plate is provided between said light radiating means and the optical recording medium.

4. The optical head according to claim 1 wherein a Foucault prism is provided between said beam splitter and the light receiving means.

5. The optical head according to claim 1 wherein said light receiving means detects a light reception signal for generating focussing error signals by a plurality of light receiving sections obtained on splitting solely by a splitting line substantially parallel to said projected straight line.

6. The optical head according to claim 1 wherein said light receiving means detects light reception signals from said optical recording medium by a plurality of light receiving sections obtained on splitting by a splitting line substantially parallel to said projected straight line.

7. The optical head according to claim 1 wherein a diffraction grating is provided between said light radiating means and the beam splitter for splitting the laser light radiated from said light radiating means into a plurality of light beams including a main beam and a pair of subsidiary beams; and wherein
    said light receiving element includes a pair of light receiving portions on both sides of a direction substantially perpendicular to said projected straight line of said plural light receiving sections, said paired light receiving portions receiving said paired subsidiary beams, among said plural light beams split by said diffraction grating, to detect a light reception signal used for generating tracking error signals.

8. The optical head according to claim 1 wherein the relative positions of said first and second light sources of said light radiating means are set so that the straight line interconnecting a spot position of said first laser light illuminated on said optical recording medium and a spot position of said second laser light illuminated on said optical recording medium will be 90±10° with respect to a recording track of said optical recording medium.

9. The optical head according to claim 1 further comprising:
    a light deflecting member arranged between said beam splitter and the light converging means for deflecting the laser light radiated in a direction parallel to a recording surface of said optical recording medium from said light radiating means towards said light converging means.

10. The optical head according to claim 9 wherein said first and second light sources are arranged in a plane substantially parallel to the recording surface of said optical recording medium.

11. An optical head for coping with a plurality of optical discs of different types, comprising:
    a semiconductor laser including a first light source for radiating a first laser light and a second light source for radiating a second laser light having a wavelength different from that of said first laser light, said first and second light sources being housed in the same package in proximity to each other, said semiconductor laser selectively emitting said first laser light or the second laser light depending on the disc type;
    an objective lens for converging the laser light from said semiconductor laser on said optical disc;
    a beam splitter for separating the optical path of the laser light proceeding towards said optical disc and that of the laser light reflected from said optical disc from each other; and
    a light receiving element for receiving the return laser light reflected back from said optical disc; wherein
    the relative positions of said first and second light sources of said light radiating means are so set that a straight line interconnecting a spot position of said first laser light illuminated on said optical disc and a spot position of said second laser light illuminated on said optical disc will be substantially perpendicular to a recording track of said optical disc; and wherein said light receiving element includes a plurality of light receiving sections arrange substantially parallel to a straight line projected on said light receiving unit, said straight line being such a line interconnecting the spot position of said first laser light illuminated on said optical disc and the spot position of said second laser light similarly illuminated on said optical disc.

12. The optical head according to claim 11 wherein the separation between the first and second light sources is 80 to 200 μm.

13. The optical head according to claim 11 wherein said light receiving element detects a light receiving signal for generating focussing error signals by plural light receiving sections obtained on splitting only by a splitting line substantially parallel to said projected straight line.

14. The optical head according to claim 11 wherein a straight line interconnecting the light spot of said first laser light of said semiconductor laser illuminated on said optical disc and the spot position of said second laser light is arranged at an angle of 90°±10° with respect to the recording track of the optical disc.

15. The optical head according to claim 11 further comprising:
a light beam deflecting member arranged between said beam splitter and the objective lens for deflecting the laser light radiated from said semiconductor laser in a direction parallel to a recording surface of the optical disc in a direction towards said objective lens.

16. The optical head according to claim 15 wherein said first and second light sources are arranged in respective planes substantially parallel to the recording surface of said optical disc.

17. An optical disc device for recording and/or reproducing signals in association with a plurality of optical discs of different types, said device comprising:
a spindle motor for rotationally driving said optical disc;
an optical head adapted for coping with said plural optical discs of different types; and
a signal processing circuit for generating playback signals and control signals based on signals detected by said optical head;
said optical head including
light radiating means having a first light source for radiating a first laser light and a second light source for radiating a second laser light having a wavelength different from that of said first laser light, said first and second light sources being housed in the same package;
an objective lens for converging the laser light from said light radiating means towards an optical disc;
a beam splitter for separating an optical path of the laser light radiated from said light radiating means into an optical path of the laser light proceeding towards said optical disc and that of the laser light reflected from said optical disc; and
a light receiving element for receiving the return laser light reflected back from said optical disc; wherein
the relative positions of said first and second light sources of said light radiating means are so set that a straight line interconnecting a spot position of said first laser light illuminated on said optical disc and a spot position of said second laser light illuminated on said optical disc will be substantially perpendicular to a recording track of said optical disc; and wherein
said light receiving element includes a plurality of light receiving sections arrange substantially parallel to a straight line projected on said light receiving means, said straight line being such a line interconnecting a spot position of said first laser light illuminated on said optical disc and a spot position of said second laser light similarly illuminated on said optical disc.

18. The optical disc device according to claim 17 wherein the separation between the first and second light sources is 80 to 200 μm.

19. The optical disc device according to claim 17 wherein a Foucault prism is provided between said beam splitter and the light receiving element.

20. The optical disc device according to claim 17 wherein said light receiving element detects a light reception signal for generating focussing error signals by a plurality of light receiving sections obtained on splitting solely by a splitting line substantially parallel to said projected straight line.

21. The optical disc device according to claim 17 wherein said light receiving means detects light reception signals from said optical disc by a plurality of light receiving sections obtained on splitting by a splitting line substantially parallel to said projected straight line.

22. The optical disc device according to claim 17 wherein a diffraction grating is provided between said light radiating means and the beam splitter for splitting the laser light radiated from said light radiating means into a plurality of light beams including a main beam and a pair of subsidiary beams; and wherein
said light receiving element includes a pair of light receiving portions of said plural light receiving sections on both sides of a direction substantially perpendicular to said projected straight line, said paired light receiving portions receiving said paired subsidiary beams, among said plural light beams split by said diffraction grating, to detect a light reception signal used for generating tracking error signals.

23. The optical disc device according to claim 17 wherein said light radiating means are arranged so that the straight line interconnecting a spot position of said first laser light illuminated on said optical disc and a spot position of said second laser light illuminated on said optical disc will be 90±10° with respect to a recording track of said optical disc.

24. The optical disc device according to claim 17 further comprising:
a light deflecting member arranged between said beam splitter and the objective lens for deflecting the laser light radiated in a direction parallel to a recording surface of said optical disc from said light radiating means in a direction towards said light converging means.

25. The optical disc device according to claim 24 wherein said first and second light sources are arranged in a plane substantially parallel to the recording surface of said optical disc.

* * * * *

UNITED STATES PATENT AND TRADEMARK OFFICE
CERTIFICATE OF CORRECTION

PATENT NO. : 6,404,721 B1
DATED : June 11, 2002
INVENTOR(S) : Yoshito Asoma It is certified that error appears in the above-identified patent and that said Letters Patent is hereby corrected as shown below:

Column 13,
Line 2, replace "arrange" with -- arranged --.

Signed and Sealed this

Twentieth Day of May, 2003

JAMES E. ROGAN
*Director of the United States Patent and Trademark Office*